United States Patent
Knoll (10) Patent No.: US 10,113,336 B2
(45) Date of Patent: Oct. 30, 2018

(54) ORIFICE FLOWMETER SECURITY DEVICE

(71) Applicant: Daniel Measurement and Control, Inc., Houston, TX (US)

(72) Inventor: Fred Knoll, Calgary (CA)

(73) Assignee: Daniel Measurement and Control, Inc., Houston, TX (US)

( * ) Notice: Subject to any disclaimer, the term of this patent is extended or adjusted under 35 U.S.C. 154(b) by 230 days.

(21) Appl. No.: 14/934,308

(22) Filed: Nov. 6, 2015

(65) Prior Publication Data

US 2016/0131510 A1    May 12, 2016

Related U.S. Application Data (60) Provisional application No. 62/076,954, filed on Nov. 7, 2014.

(51) Int. Cl.
*E05B 65/00*    (2006.01)
*G01F 1/42*    (2006.01)
*G01F 15/14*    (2006.01)

(52) U.S. Cl.
CPC .......... *E05B 65/0089* (2013.01); *G01F 1/42* (2013.01); *G01F 15/14* (2013.01)

(58) Field of Classification Search
CPC .......... Y10T 70/5611; Y10T 70/5615; Y10T 70/5619; Y10T 70/5624; Y10T 70/5633; Y10T 70/5637; G01F 15/14; G01F 1/42; G01F 1/74; G01F 1/34; G01F 1/36; G01F 1/00; G01F 1/40; F16K 35/00; F16K 35/02; F16K 35/04; F16K 35/06; F16K 35/10; F16K 35/025; E05B 67/383; E05B 67/38; E05B 13/001

USPC .......... 70/174, 175, 176, 177, 178, 179, 180
See application file for complete search history.

(56) References Cited

U.S. PATENT DOCUMENTS

| | | | | |
|---|---|---|---|---|
| 5,743,118 A * | 4/1998 | Anderson | ............. | E05B 13/002 292/205 |
| 6,227,016 B1 * | 5/2001 | Yu | ............. | E05B 37/025 70/30 |
| 7,104,521 B2 * | 9/2006 | Loga | ............. | F16K 5/0407 138/44 |
| 8,955,540 B2 * | 2/2015 | Agbay | ............. | F16K 35/06 137/382 |
| 2005/0258387 A1 * | 11/2005 | Loga | ............. | F15D 1/0005 251/273 |
| 2013/0167948 A1 * | 7/2013 | Marion | ............. | F16K 35/00 137/383 |

* cited by examiner

*Primary Examiner* — Peter M. Cuomo
*Assistant Examiner* — Amanda L Bailey
(74) *Attorney, Agent, or Firm* — Conley Rose, P.C.

(57) ABSTRACT

A device and method for securing an orifice flowmeter and preventing unauthorized access to the flowmeter while in service is disclosed. The security device includes a housing having a top surface, a bottom surface, a closed end, an open end, a front surface, and a back surface forming a cavity. Through bores extend coaxially through the top surface and the bottom surface proximate the open end. Some embodiments include protrusions coupled to the interior of cavity. The protrusions together with the back surface of the housing are configured to surround exposed portions of the flowmeter, such that the addition of a shackle portion of a locking device through the through bores will prevent removal of the security device from the flowmeter and subsequently prevent access to the flowmeter.

14 Claims, 8 Drawing Sheets

ORIFICE FLOWMETER SECURITY DEVICE

CROSS-REFERENCE TO RELATED APPLICATIONS

This application claims benefit of priority to U.S. Provisional Patent Application Ser. No. 62/076,954, filed Nov. 7, 2014, entitled "Orifice Flowmeter Security Device," which is hereby incorporated herein by reference in its entirety.

STATEMENT REGARDING FEDERALLY SPONSORED RESEARCH OR DEVELOPMENT

Not applicable.

BACKGROUND

In pipeline operations and other industrial applications, flowmeters are used to measure the volumetric flow rate of a gaseous or liquid flow stream moving through a piping section. The pressure in the flowmeter can be high, so a need exists to control access to the flowmeter. For safety reasons, access to the flowmeter should be limited to authorized parties.

BRIEF SUMMARY OF THE DISCLOSURE

In one embodiment, a security device for use with an orifice flowmeter and a locking device includes a housing having a top surface, a bottom surface, a closed end, an open end, a front surface, and a back surface forming a cavity. Further, the cavity is exposed at the open end and the back surface, where the back surface includes a cutout forming an upper back surface portion and a lower back surface portion. In addition, the upper back surface portion and the lower back surface portion of the device are configured to slidingly and releasably engage an indentation disposed on the flowmeter. Moreover, the top surface includes a through bore that is coaxial with a through bore of the bottom surface proximate the open end. Further, the top surface through bore and the bottom surface through bore are configured to allow a rod to pass therethrough thereby preventing removal of the security device from the flowmeter.

In one embodiment, an orifice flowmeter having a security device includes a body, a gear shaft disposed on the body, a lower drive disposed on the body, a first nut disposed on the gear shaft and forming a first indentation between the first nut and the body, and a second nut disposed on the lower drive and forming a second indentation between the second nut and the body. In addition, the security device covers the gear shaft, lower drive, and first and second nuts to prevent access. The security device further includes a back surface having a cutout that forms an upper back surface portion and a lower back surface portion. Moreover, the upper back surface portion and the lower back surface portion are configured to slidingly and releasably engage the first and second indentations. Further, the security device includes a through bore that extends from a top surface through a bottom surface, the through bore is configured to allow a rod to pass therethrough to prevent removal of the security device from the flowmeter.

In one embodiment, a method of securing an orifice flowmeter includes sliding an open end of a security device onto a gear shaft and a lower drive of the flowmeter, the security device further having a top surface, a bottom surface, a closed end, a front surface, and a back surface forming a cavity. In addition, the method includes engaging a first indentation between a first nut on the gear shaft and the flowmeter with an upper back surface portion and a lower back surface portion formed by a cutout in the back surface. The method further includes engaging a second indentation between a second nut on the lower drive and the flowmeter with the upper back surface portion and the lower back surface portion. Moreover, the method includes passing a shackle of a locking device through a through bore that extends from the top surface through the bottom surface proximate the open end, and engaging the locking device to a closed or locked position.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components.

As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 1:
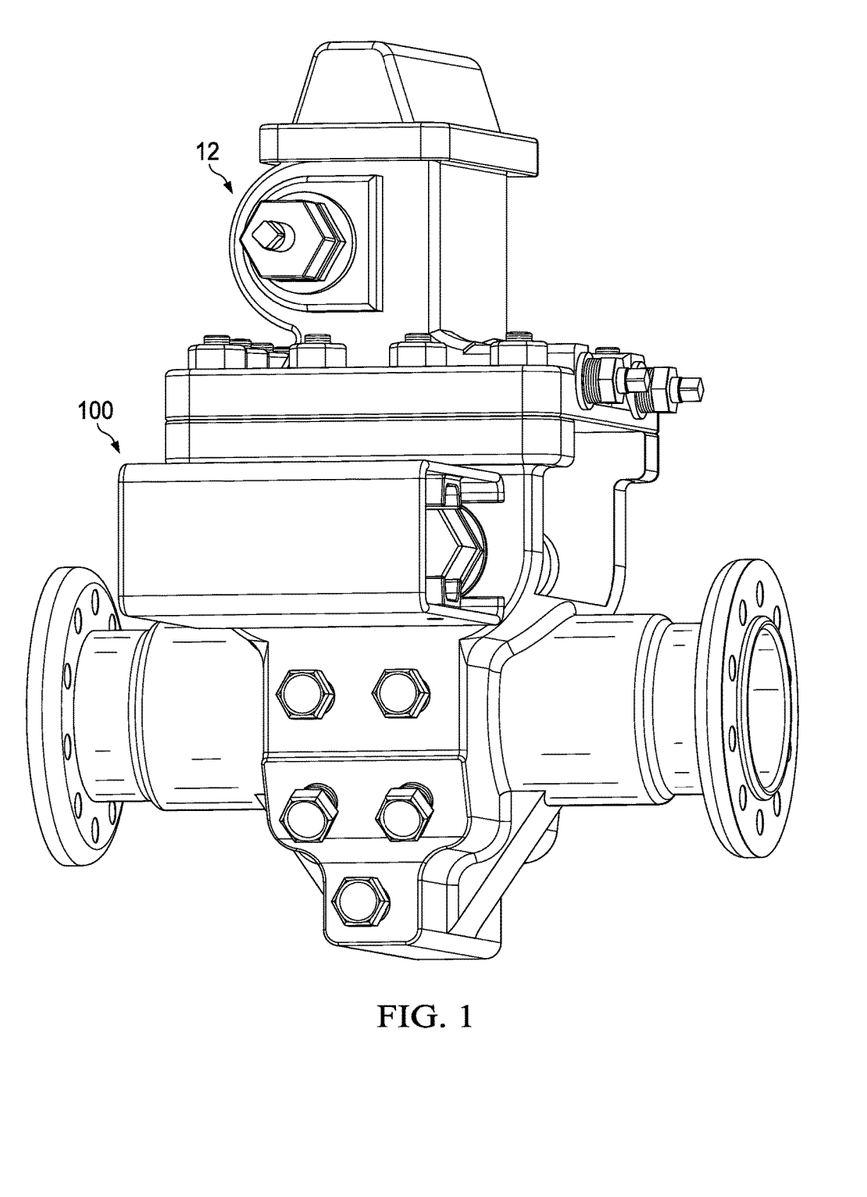
FIG. 1 is an external view of an orifice flowmeter with a security device in accordance with the principles described herein.
Figure 2:
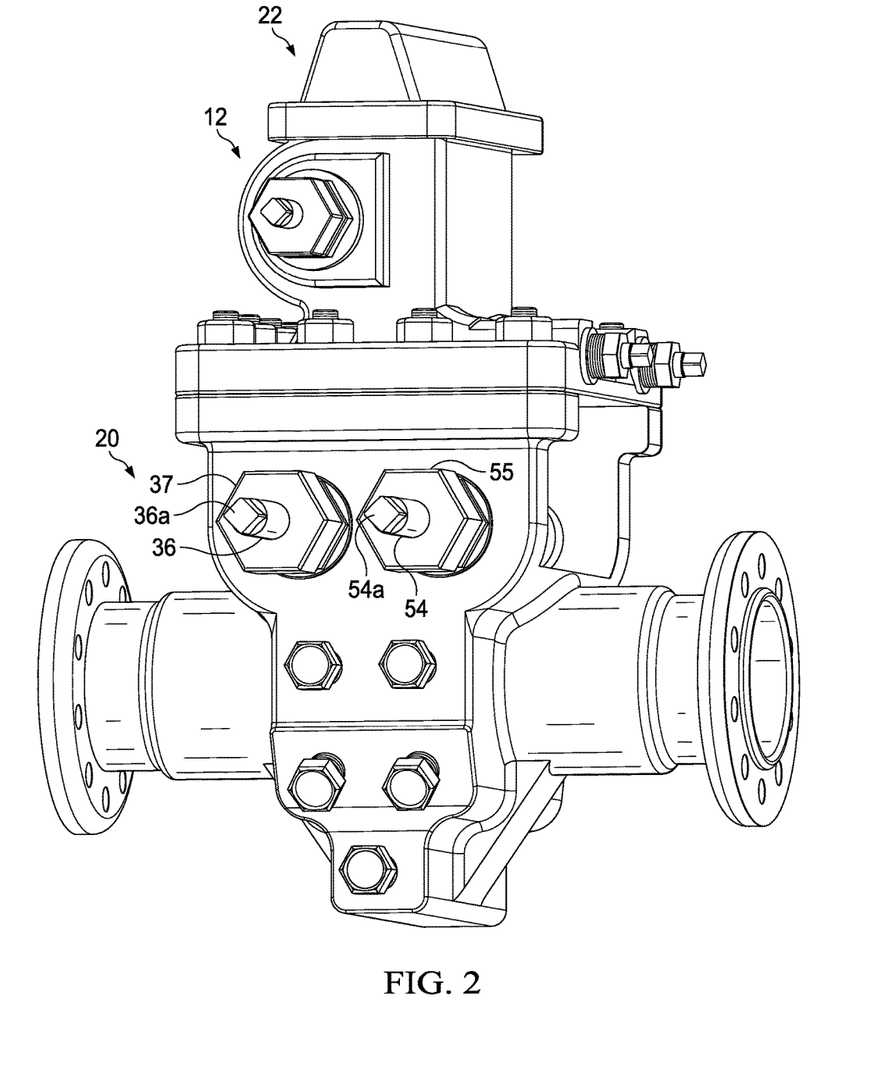
FIG. 2 shows an external view of the orifice flowmeter of FIG. 1 without the security device.

Referring now to FIGS. 1 and 2; a security device 100 is installed on an orifice flowmeter 12 as shown in FIG. 1, and FIG. 2 shows the flowmeter 12 without the security device. The security device 100 prevents unauthorized access to the flowmeter 12.

Figure 3:
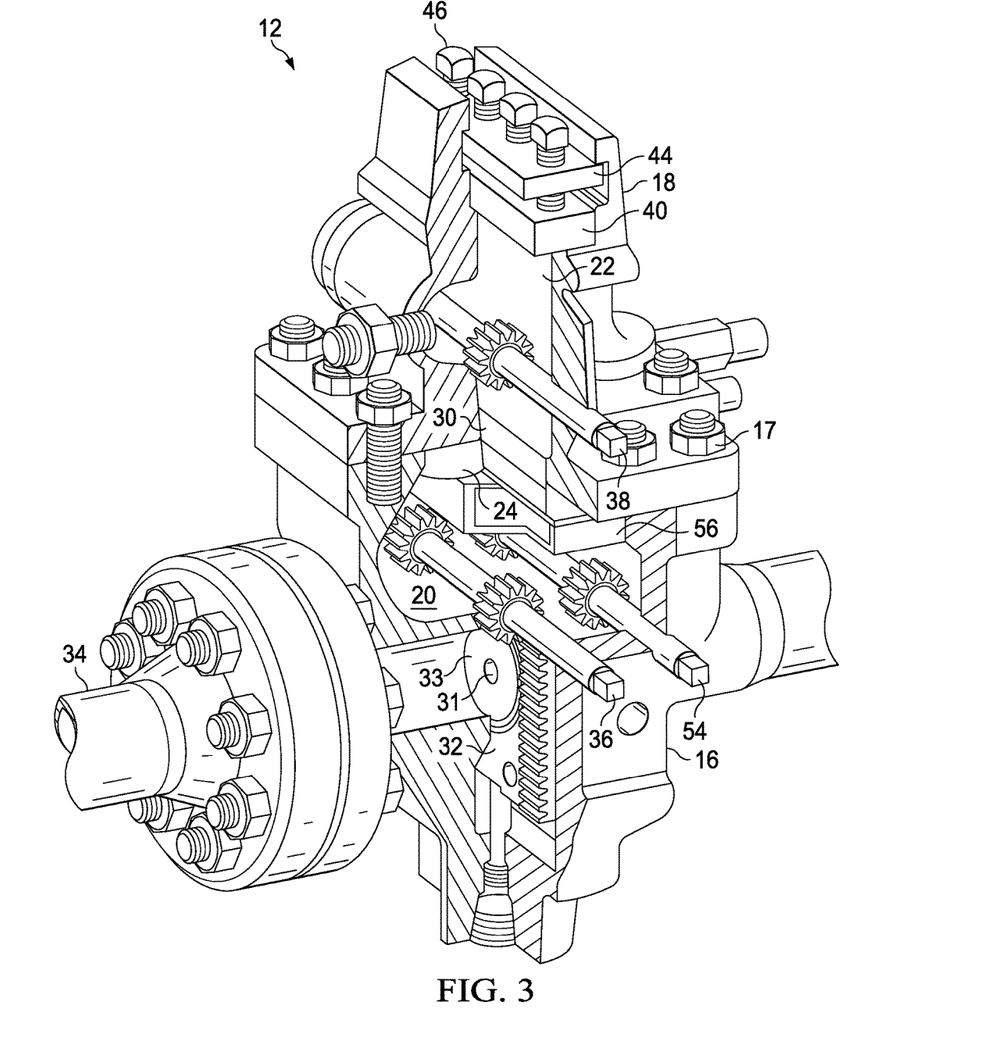
FIG. 3 is a partial sectional isometric view of a dual chamber orifice flowmeter.

Referring now to FIG. 3, a sectional view of an example of an orifice flowmeter 12, more specifically a dual chamber orifice fitting, is illustrated in FIG. 2. Orifice flowmeter 12 includes body 16 and top 18. Body 16 encloses lower chamber 20, which is in fluid communication with the interior 34 of pipeline. Top 18 encloses upper chamber 22 and is connected to body 16 by bolts 17. Aperture 30 defines an opening connecting upper chamber 22 to lower chamber 20. Valve seat 24 is connected to top 18 and provides a sealing engagement with slide valve plate 56, which is slidably actuated by rotating gear shaft 54. Lower drive 36 and upper drive 38 operate to move orifice plate carrier 32 vertically within flowmeter 12.

Orifice 31 is located on an orifice plate 33 supported by orifice plate carrier 32. Orifice plate carrier 32 is shown in a metering position in alignment with bore 34. To remove orifice plate carrier 32 from flowmeter 12, the gear shaft 54 is rotated to slide valve plate 56 laterally and away from valve seat 24 and open aperture 30. Once aperture 30 is opened, lower drive 36 is actuated to move orifice plate carrier 32 upwards into upper chamber 22. Once orifice plate carrier 32 is entirely within upper chamber 22, aperture 30 is closed to isolate the upper chamber from bore 34 and lower chamber 20. Any pressure within upper chamber 20 can then be relieved and orifice plate carrier 32 can be removed from flowmeter 12 by loosening clamping bar screws 46 and removing clamping bar 44 and sealing bar 40 from top 18.

Figure 4:
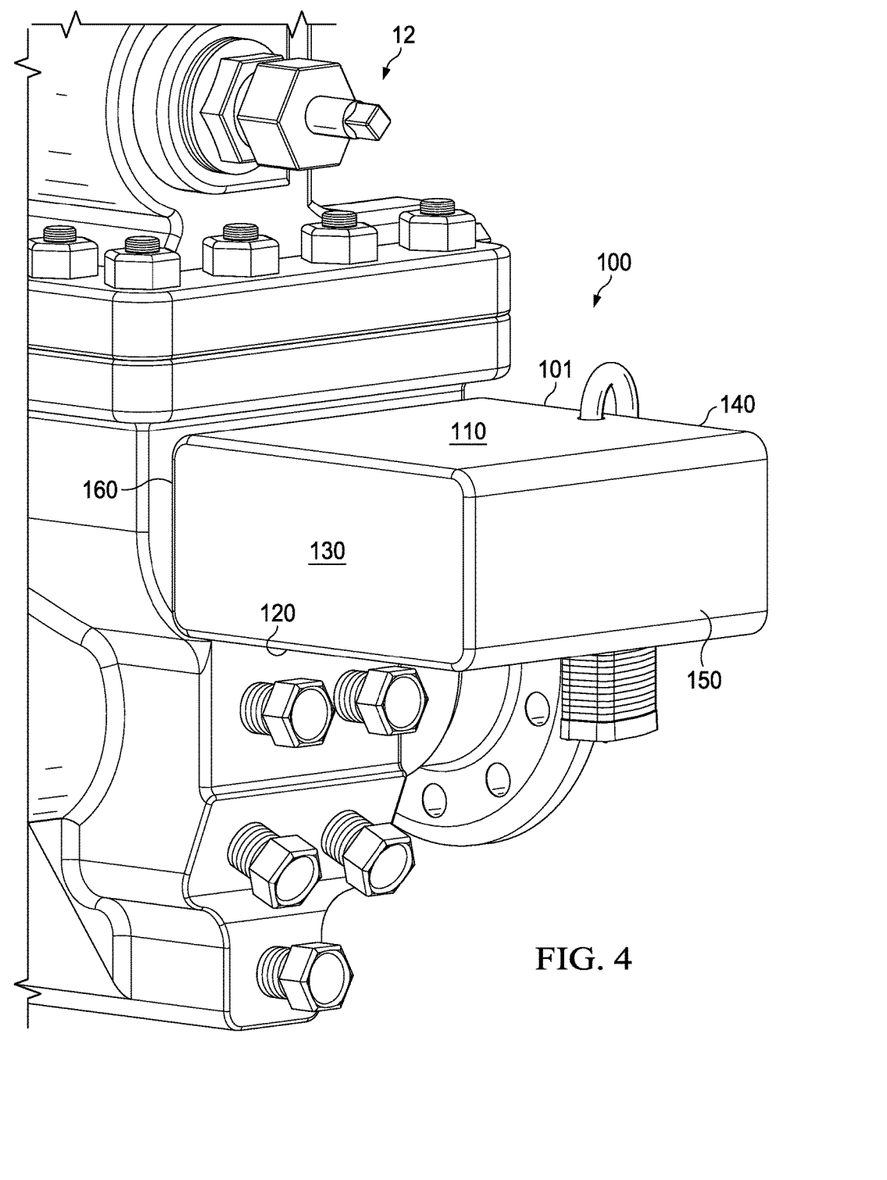
FIG. 4 is an external side view of the security device of FIG. 1.
Figure 5:
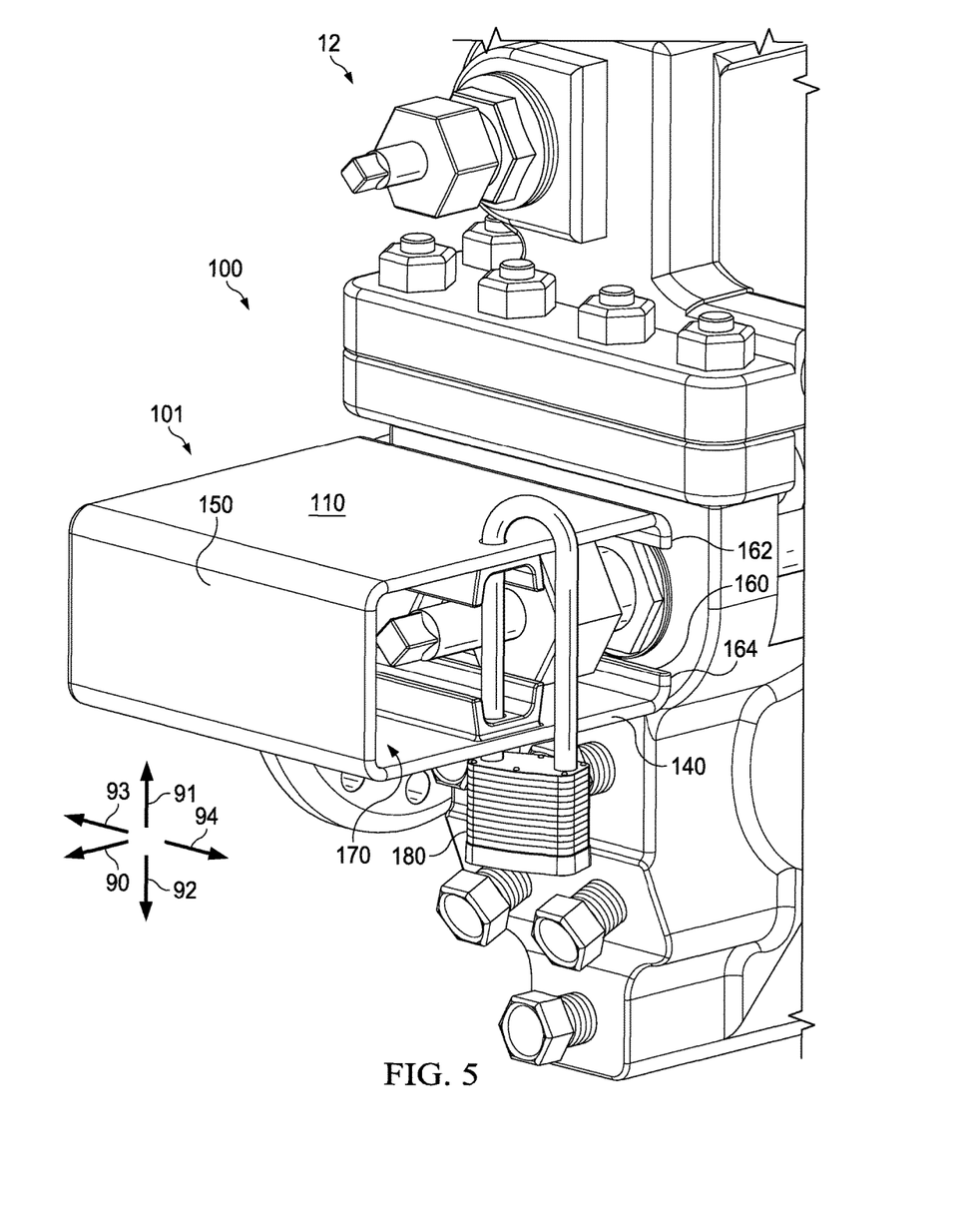
FIG. 5 is an external side view of the security device of FIG. 1.
Figure 7:
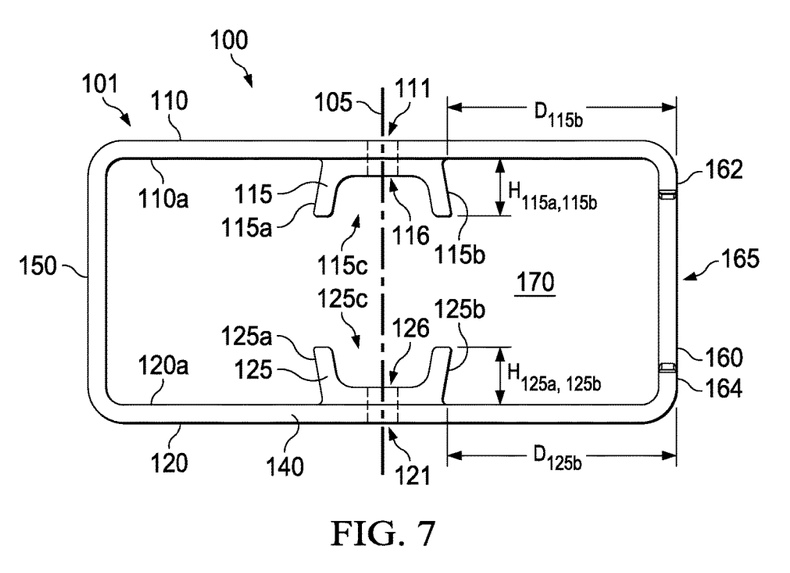
FIG. 7 shows a partial cross-sectional side view of the security device of FIG. 1.

Referring now to FIGS. 4-5, an embodiment of a security device 100 is shown. Security device 100 includes housing 101 having a top surface 110, bottom surface 120, a closed end 130, an open end 140, a front surface 150, and a back surface 160 to form a cavity or interior 170, in accordance with the principles described herein is shown. Referring now to FIG. 7, top surface 110 is generally parallel to and spaced apart from bottom surface 120; the top surface 110 and the bottom surface 120 are generally rectangular. In this embodiment, top surface 110 and bottom surface 120 include coaxial through bores 111, 121, respectively, having a central axis 105. Through bores 111, 121 are disposed approximately halfway between the front surface 150 and the back surface 160, and proximate the open end 140. In other embodiments, the through bores may be located closer to the front surface 150 or closer to the back surface 160.

Figure 6:
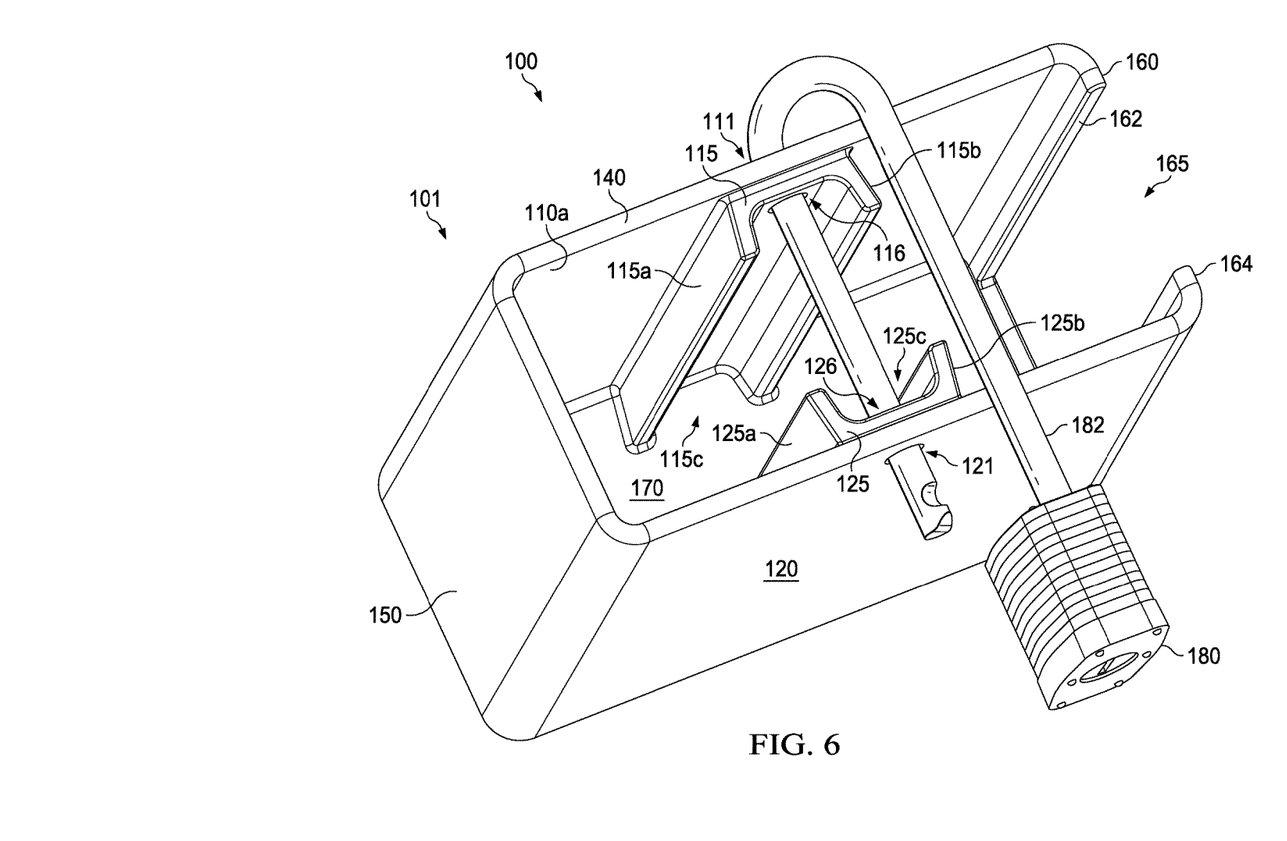
FIG. 6 shows an internal side view of the security device of FIG. 2

Referring now to FIGS. 6 and 7, closed end 130 is generally parallel to and spaced apart from open end 140; the closed end 130 and the open end 140 are generally rectangular and thus, generally perpendicular to top surface 110 and bottom surface 120. In the present embodiment, the open end 140 exposes the edges of the top surface 110, bottom surface 120, and front surface 150 proximate the open end 140. Further, cavity 170 is exposed at open end 140. In an alternative embodiment, the positions of the open end 140 and closed end 150 may be reversed.

Referring now to FIG. 7, front surface 150 is generally parallel to and spaced apart from back surface 160; the front surface 150 and the back surface 160 are generally rectangular and thus, generally perpendicular to top surface 110 and bottom surface 120 and generally perpendicular to closed end 130 and open end 140. In the present embodiment, the back surface 160 includes a cutout 165 that extends from the closed end 130 to the open end 140 and forms upper back surface portion 162 proximate top surface 110 opposite lower back surface portion 164 proximate bottom surface 120. Cutout 165 provides access to cavity 170.

Referring now to FIGS. 6 and 7, the interior or cavity 170 comprises a first and a second generally U-shaped protrusion or channel 115, 125, respectively. The first U-shaped protrusion or channel 115 comprises opposing side walls 115a, 115b separated by a channel or groove 115c, the side walls 115a, 115b having a height $H_{115a}$, $H_{115b}$, respectively. The first U-shaped channel 115 is coupled to an interior side 110a of the top surface 110 and extends from the closed end 130 to the open end 140 approximately halfway between the front surface 150 and the back surface 160. The first U-shaped channel 115 thus has a length approximately equivalent to the length of top surface 110, and further includes a through bore 116 having a central axis 105. In the present embodiment, through bore 116 is disposed approximately halfway between the opposing side walls 115a, 115b of the U-shaped channel 115 and is coaxial with and has a similar diameter as the through bore 111 of the top surface 110. In alternative embodiments, the U-shaped channel 115 does not overlap through bore 111 of the top surface 110 and does not include a through bore.

The second U-shaped protrusion or channel 125 comprises opposing side walls 125a, 125b separated by a channel or groove 125c, the side walls 125a, 125b having a height $H_{125a}$, $H_{125b}$, respectively. The second U-shaped channel 125 is coupled to an interior side 120a of the bottom surface 120 and extends from the closed end 130 to the open end 140 approximately halfway between the front surface 150 and the back surface 160. The second U-shaped channel 125 thus has a length approximately equivalent to the length of bottom surface 120, and further includes a through bore 126 having a central axis 105. Through bore 126 is disposed approximately halfway between the opposing side walls 125a, 125b of the U-shaped channel 125 and is coaxial with and has a similar diameter as through bore 121 of the bottom surface 120. In alternative embodiments, the U-shaped channel 115 does not overlap through bore 111 of the top surface 110 and does not include a through bore.

Further, the through bores 111, 116 of the top surface 110 and first U-shaped channel 115, respectively, are coaxial with and have similar diameters as the through bores 121, 126 of the bottom surface 120 and second U-shaped channel 125, respectively. In an alternative embodiment, cavity 170 does not include any U-shaped channels. In other embodiments, cavity 170 may comprise only one U-shaped channel coupled to either the interior side 110a of the top surface 110 or to the interior side 120a of the bottom surface 120. In further embodiments, components having various geometries other than U-shaped channels may be disposed in cavity 170. Any suitable geometry may be used including, but not limited to, an L-shaped bracket, a rectangular component, and a plurality of cylindrical posts.

Referring now to FIG. 2, an example of a flowmeter 12 before installation of the security device 100 is shown. As previously described, the slide valve plate 56 (see FIG. 3) separates the upper chamber 22 from the lower chamber 20 and is actuated by rotation of the gear shaft 54. Upon rotation of the gear shaft 54, the slide valve plate 56 slides laterally to create aperture 30 (see FIG. 3). The orifice plate carrier 32 (see FIG. 3) can then be raised from the lower chamber 20 to the upper chamber 22 by actuating the lower drive 36. In the present embodiment, gear shaft 54 has an end 54a and includes a nut 55 proximate the flowmeter 12, and lower drive 36 has an end 36a and includes a nut 37. To prevent unauthorized actuation of the slide valve plate 56 and orifice plate carrier 32, the security device 100 is placed around both the gear shaft 54 with nut 55 that actuates the slide valve plate 56 and around the lower drive 36 with nut 37 that actuates the orifice plate carrier 32, and a lock 180 (see FIG. 6) is inserted through the through bores 111, 116, 121, 126. In alternative embodiments, the lower drive 36 and gear shaft 54 of flowmeter 12 may comprise components other than nuts having varying geometry that will actuate the slide valve plate 56.

Figure 8A:
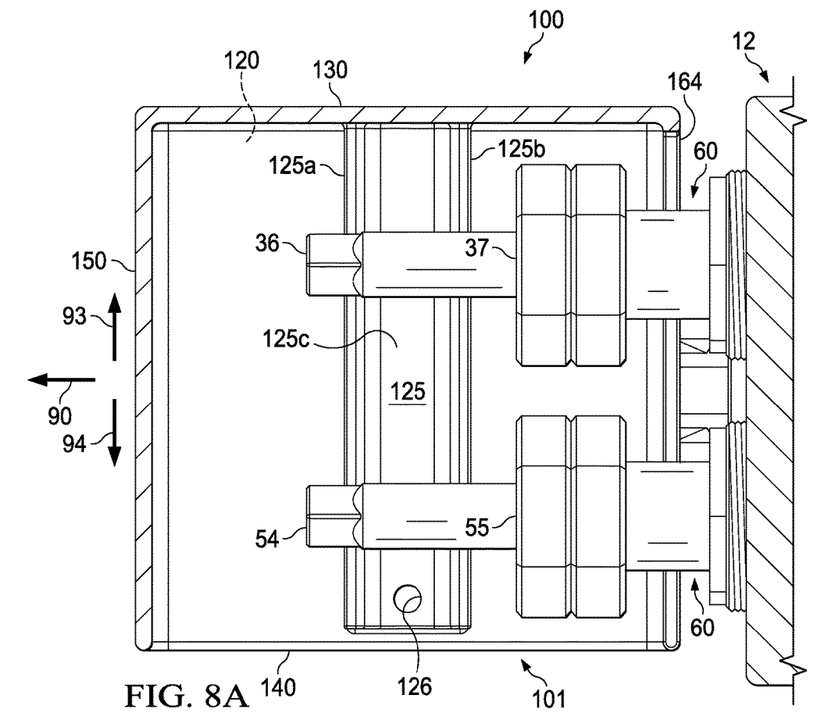
FIG. 8A shows a partial cross-sectional top view of the orifice flowmeter with the security device of FIG. 1.
Figure 8B:
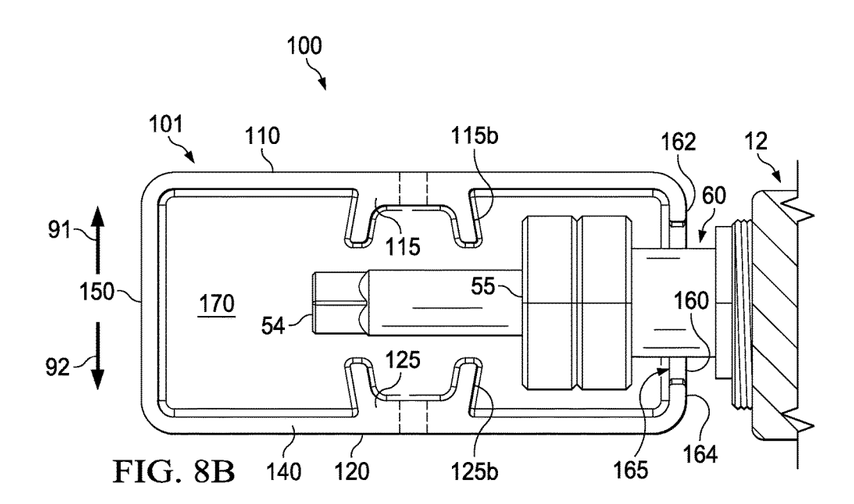
FIG. 8B shows a partial cross-sectional side view of the orifice flowmeter with the security device of FIG. 1.

Referring now to FIGS. 2, 7, 8A, and 8B, to install the security device 100 on the flowmeter 12, the open end 140 of security device 100 is aligned with the lower drive 36 with nut 37 and the gear shaft 54 with nut 55 such that back surface 160 is proximate flowmeter 12 (see FIG. 8B). The security device 100 then slides across both the lower drive 36 with nut 37 and the gear shaft 54 with nut 55 until cavity 170 encloses both nuts 37, 55, the lower drive 36, and the gear shaft 54. More specifically, the nuts 37, 55 are located between channel side walls 115b, 125b and back surface 160. Thus, the distance $D_{115b}$, $D_{125b}$ between channel side walls 115b, 125b and the back surface 160 is configured to allow the nuts 37, 55 to fit between channel side walls 115b, 125b and the back surface 160 when the security device 100 is installed on the flowmeter 12 (FIG. 8B). Further, the height $H_{115b}$, $H_{125b}$ of side walls 115b, 125b, respectively, is configured to allow side walls 115b, 125b to extend beyond the outer diameter or edge of the nuts 37, 55 when installed on flowmeter 12 without contacting or interfering with the lower drive 36 or gear shaft 54 (FIGS. 7 and 8B). Side walls 115b, 125b may, but need not, contact the nuts 37, 55 when the security device 100 is installed on flowmeter 12. The top surface 110, bottom surface 120, and closed end 130 of housing 101 are all configured such that front surface 150, when the security device 100 is installed on flowmeter 12, does not contact or interfere with ends 36a, 54a of lower drive 36 and gear shaft 54, respectively.

Referring now to FIGS. 8A and 8B, when security device 100 is installed on flowmeter 12, the top surface 110 is disposed above lower drive 36 with nut 37 and above gear shaft 54 with nut 55, and the bottom surface 120 is disposed below lower drive 36 with nut 37 and below gear shaft 54 with nut 55. In addition, lower drive 36 with nut 37 and gear shaft 54 with nut 55 are located between the closed end 130 and the open end 140. Further, the back surface 160 is disposed proximate flowmeter 12 such that upper back surface portion 162 and lower back surface portion 164 are disposed in an indentation or narrowed portion 60 between the flowmeter 12 and nuts 37, 55, and ends 36a, 54a of lower drive 36 and gear shaft 54, respectively, are disposed between the front surface 150 and the back surface 160.

Referring now to FIGS. 5, 7, 8A, and 8B, after security device 100 is positioned on flowmeter 12 as described above, a shackle portion 182 of a locking device 180 is placed through all the coaxial through bores 111, 116, 121, 126 (see FIG. 6 for shackle 182 inserted in through bores 111, 116, 121, 126 while not installed on flowmeter 12) and engaged with the locking mechanism within the locking device 180 to place the locking device 180 in a closed position (see FIG. 5). When the locking device 180 is engaged, the security device 100 prevents access to the lower drive 36 and gear shaft 54. More specifically, closed end 130 prevents movement of the security device 100 in direction 94 as closed end 130 would contact nut 37; shackle 182 prevents movement of the security device 100 in direction 93 as shackle 182 would contact gear shaft 54; top surface 110 prevents movement of the security device 100 in direction 92 as top surface 110 would contact nuts 37, 55; bottom surface 120 prevents movement of the security device 100 in direction 91 as bottom surface 120 would contact nuts 37, 55; and upper and lower back surface portions 162, 164, respectively, prevent movement of the security device 100 in direction 90 away from flowmeter 12 as upper and lower back surface portions 162, 164 would contact nuts 37, 55. Lock 180 may be any suitable commercial lock known in the art including, but not limited to, a combination lock, a keyed lock, and a padlock. In other embodiments, through bores 111, 116, 121, 126 may be adjusted to accommodate various lock configurations and shapes as well as multiple locks.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A security device for use with an orifice flowmeter and a locking device, the security device comprising: a housing having a top surface, a bottom surface, a closed end, an open end, a front surface, and a back surface forming a cavity, and a first protrusion disposed in the cavity on an interior side of one of the top surface or the bottom surface, the first protrusion further disposed between the front surface and the flowmeter when the security device is secured to the flowmeter; wherein the cavity is exposed at the open end and the back surface, which comprises a cutout forming an upper back surface portion and a lower back surface portion, the upper back surface portion and the lower back surface portion configured to slidingly and releasably engage a gap formed between a nut and a body of the flowmeter when the security device is secured to the flowmeter; wherein the top surface includes a through bore that is coaxial with a through bore of the bottom surface proximate the open end; wherein the top surface through bore and the bottom surface through bore are configured to allow a rod to pass therethrough thereby preventing removal of the security device from the flowmeter; wherein the first protrusion comprises a pair of side walls extending from the closed end of the housing and a channel disposed between the pair of side walls.

2. The security device of claim 1, wherein the rod comprises a shackle portion of the locking device.

3. The security device of claim 1, further comprising a second protrusion disposed in the cavity on the other of the top surface or the bottom surface, the second protrusion further disposed between the front surface and the flowmeter when the security device is secured to the flowmeter.

4. The security device of claim 1, wherein the first protrusion is disposed adjacent the nut of the flowmeter when the security device is secured to the flowmeter.

5. The security device of claim 2, wherein the rod is disposed between the open end and the flowmeter when the security device is secured to the flowmeter.

6. An orifice flowmeter having a security device, the flowmeter comprising: a body; a gear shaft disposed on the body; a lower drive disposed on the body; a first nut disposed on the gear shaft and forming a first gap between the first nut and the body; and a second nut disposed on the lower drive and forming a second gap between the second nut and the body; wherein the security device covers the gear shaft, lower drive, and first and second nuts to prevent access; wherein the security device comprises a back surface having a cutout that forms an upper back surface portion and a lower back surface portion, the upper back surface portion and the lower back surface portion configured to slidingly and releasably engage the first and second gaps; wherein the security device includes a top surface, a bottom surface, and a through bore that extends from the top surface through the bottom surface, the through bore configured to allow a rod to pass therethrough to prevent removal of the security device from the flowmeter; and wherein the security device includes the top surface, the bottom surface, a closed end, an open end, and a front surface forming a cavity, and a first protrusion disposed in the cavity on an interior side of one of the top surface or the bottom surface, the first protrusion further disposed between the front surface and the body of the flowmeter, wherein the first protrusion comprises a pair of side walls extending from the closed end of the security device and a channel disposed between the pair of side walls.

7. The orifice flowmeter of claim 6, wherein the rod comprises a shackle portion of a locking device.

8. The orifice flowmeter of claim 6, further comprising a second protrusion disposed on the other of the top surface or the bottom surface, the second protrusion further disposed between the front surface and the body of the flowmeter.

9. The orifice flowmeter of claim 6, wherein the first protrusion is disposed adjacent at least one of the first nut and the second nut.

10. The orifice flowmeter of claim 7, wherein the rod is disposed between the open end and the flowmeter.

11. A method of securing an orifice flowmeter, the method comprising: sliding an open end of a security device onto a gear shaft and a lower drive of the flowmeter, the security device further having a top surface, a bottom surface, a closed end, a front surface, and a back surface forming a cavity, and a first protrusion disposed in the cavity on an interior side of one of the top surface or the bottom surface, the first protrusion further disposed between the front surface and the flowmeter when the security device is secured to the flowmeter and comprising a pair of side walls extending from the closed end of the security device and a channel disposed between the pair of side walls; engaging a first gap between a first nut on the gear shaft and the flowmeter with an upper back surface portion and a lower back surface portion formed by a cutout in the back surface; engaging a second gap between a second nut on the lower drive and the flowmeter with the upper back surface portion and the lower back surface portion; passing a shackle of a locking device through a through bore that extends from the top surface through the bottom surface proximate the open end; and engaging the locking device to a closed or locked position.

12. The method of claim 11, wherein the security device further comprises a second protrusion disposed in the cavity on the other of the top surface and the bottom surface, the second protrusion further disposed between the front surface and the flowmeter when the security device is secured to the flowmeter.

13. The method of claim 11, wherein the first protrusion is disposed adjacent at least one of the first nut and the second nut when the security device is secured to the flowmeter.

14. The method of claim 11, wherein the shackle is disposed between the open end and one of the gear shaft and the lower drive when the security device is secured to the flowmeter.

* * * * *